United States Patent [19]
Nordblad et al.

[11] 3,890,566
[45] June 17, 1975

[54] METHOD AND AN ARRANGEMENT FOR VOLTAGE TESTING AND DRYING OF ELECTRICALLY INSULATED CONDUCTORS

[75] Inventors: Sven Sigurd Nordblad, Spanga; Karl-Erik Svensson, Hagersten, both of Sweden

[73] Assignee: Telefonaktiebolaget L M Ericsson, Stockholm, Sweden

[22] Filed: Jan. 2, 1974

[21] Appl. No.: 429,978

[30] Foreign Application Priority Data
Jan. 19, 1973 Sweden............................ 73007619

[52] U.S. Cl. .................. 324/54; 34/95; 264/40; 264/344
[51] Int. Cl. ...................... G01r 31/16; F26b 13/24
[58] Field of Search ................ 324/54; 264/40, 344; 117/119.6; 118/100, 123; 34/9, 71, 95

[56] References Cited
UNITED STATES PATENTS

| 2,360,944 | 10/1944 | Fruth | 324/54 X |
| 2,785,478 | 3/1957 | Audas et al. | 34/9 |
| 2,900,597 | 8/1959 | Gooding | 324/54 |
| 2,938,276 | 5/1960 | Doleman et al. | 34/95 |
| 3,045,281 | 7/1962 | Skobel | 324/54 X |
| 3,263,165 | 7/1966 | Eigen | 324/54 |
| 3,364,420 | 1/1968 | Kreuger | 324/54 |

FOREIGN PATENTS OR APPLICATIONS

| 174,333 | 2/1923 | United Kingdom | 324/54 |
| 207,792 | 6/1955 | Australia | 324/54 |
| 785,929 | 5/1968 | Canada | 324/54 |

Primary Examiner—Gerard R. Strecker
Attorney, Agent, or Firm—Hane, Baxley & Spiecens

[57] ABSTRACT

A method and an arrangement for voltage testing and drying an insulated electrical conductor. The insulated conductor is, after the extrusion process, brought through a pipe which is partly closed by a lead-in attached to each end of the pipe. The pipe contains a number of metal spheres which surround the conductor running through the pipe. The movement of the conductor causes the spheres to move around the conductor thus drying the same. An outer voltage source can be connected to a metallic strip inside the pipe and, due to the metal spheres, a test voltage is applied across the insulation of the wire.

8 Claims, 3 Drawing Figures

METHOD AND AN ARRANGEMENT FOR VOLTAGE TESTING AND DRYING OF ELECTRICALLY INSULATED CONDUCTORS

The present invention relates to a method and an arrangement for voltage testing and drying of insulated conductors with an inner core of electrically conducting material.

In the plastic insulation of, for example, electrical conductors by extrusion and similar methods it is usual that during the processing the density of the insulating layer is continuously tested by letting the insulated wire run through a high voltage electrode. If then the metal wire lying inside the plastic coating is grounded, an indication in a simple way can be obtained as to whether the insulating layer is intact or not.

The electrode arrangements for such purpose, known in the art, are in the main of two kinds.

A first kind consists of metallic elements, which drag or wipe on the insulated surface. These elements consist of either brushes, the bristle of which consists of thin metal fibres, usually of bronze, or the elements consist of a great number of chains hanging down in a drapery like arrangement, where the chains are dragging against the wire.

Characteristic for these embodiments is that, concerning the brushes, the bristle is worn out relatively fast, and the wire will run freely. Concerning the chain form, the hanging chains are exposed to pointwise abrasion and also in this case the wire runs freely after a short time. Furthermore, the remaining metal parts are covered with insulating plastic dust and other pollutants.

In a second kind of electrode arrangements the electrode consists of a metallic tunnel with a large number of different details but with the common function that the wire all the time runs freely from the metal walls, while at the same time the electrode voltage has been increased to such a level that the space in the tunnel will be ionized. Thus the wire runs in a kind of electrode, consisting of ionized athmosphere, which is of course not exposed to any "abrasion" similar to the above metnioned electrodes. The ionized electrode has, however, the disadvantage that the actual field strength, which will in fact be on the insulating layer, is rather indefinite, as the ionizing process is rather unstable, among other things by the fact that water vapour and moisture particles also are involved. Usually this is reflected by the fact that one normally has to work with considerably higher voltages than the above mentioned electrodes.

In the extrusion process, furthermore, the plastic insulation is cooled with water. After the cooling it is then wanted to remove the remaining moisture on the insulation, which takes place by blowing off with air. Herewith the conductor is allowed to pass through a shrouded like arrangement. In spite of the fact that a high velocity of the air stream is aimed, the arrangement will still require much air, as the air is the only medium, which removes the moisture. This means among other things that the arrangement has a high sound level.

An object of the present invention is to eliminate the above mentioned disadvantages, and to obtain a method by means of which a voltage testing of an insulated electrical conductor simultaneously with a drying of the conductor.

The method according to the present invention will find its application to an electrical conductor whose insulation has been brought through a water-cooling conduit. After this process it is desired on the one hand to voltage test the insulating layer and on the other hand to dry the wire. According to the method, the wire running in its longitudinal direction will be brought through a mainly closed chamber, which contains such a large number of metallic spheres that the wire will be completely embedded in these. By the fact that the wire is in a longitudinal movement through the chamber, the metal spheres will be brought into movement around the wire. Hereby the moisture layer on the wire from the cooling process will be transferred to the surface of the metal spheres and, owing to the fact that a larger surface to the surrounding air has now been created, will evaporate faster than if the moisture layer had remained on the surface of the insulation. According to an embodiment of the invention the metal spheres are brought into a whirl like movement around the metal wire by means of an external compressed air source, whereby a more effective drying of the insulating layer is obtained.

The arrangement according to the present invention, the characteristics of which appear from the appended claims, will be described more in detail with reference to the accompanying drawing in which:

Figure 1:
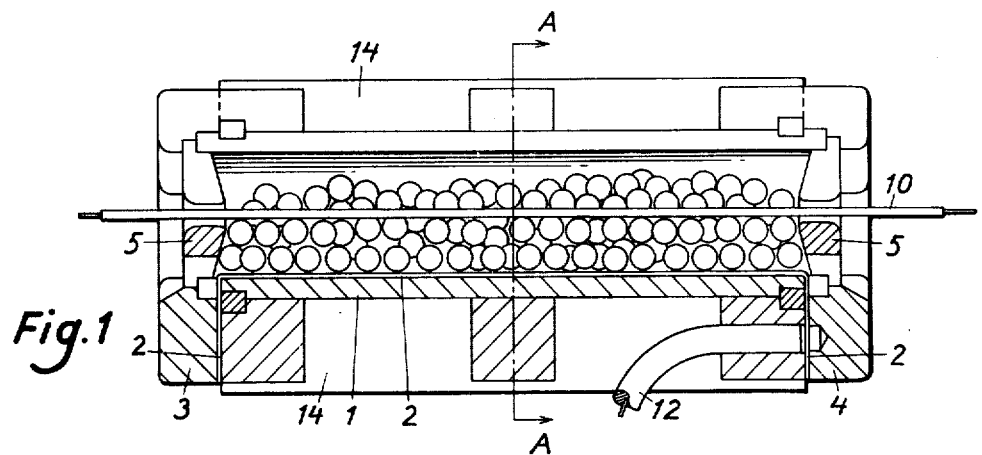
FIG. 1 shows a longitudinal section of the arrangement according to the present invention.
Figure 2:
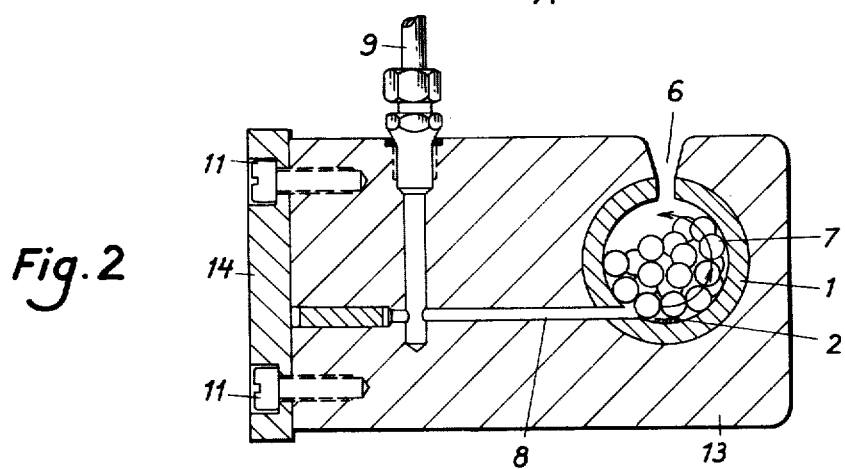
FIG. 2 shows a cross section of the arrangement along a line A—A according to FIG. 1.
Figure 3:
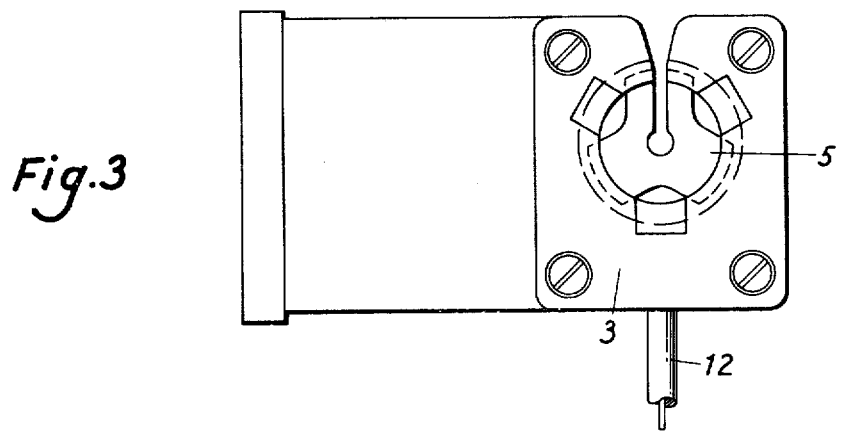
FIG. 3 shows a side view of the arrangement according to the invention.

In the FIGS. 1 and 2, 1 indicates a circular pipe of insulating material, for example acryl plastic, preferably transparent such as "Plexiglas". Inside the pipe 1 a number of metal spheres 7 are present, which can move freely around each other. Closures 3 and 4, respectively, is attached to each end. The closures 3 and 4 have a lead-in 5 through which the insulated wire 10 runs, the insulation of which is to be tested. In the lead-in 5 three slits are cut 120° displaced from each other so that plastic dust and water, which are extracted from the wire, can be evacuated from the pipe 1. In the centre of the lead-in 5 a circular hole is bored, through which the wire runs and the diameter of which is somewhat less than the diameter of a sphere, so that these are not to be able to leave the pipe 1. The number of spheres 7 are chosen so as to surround the wire 10, while not quite filling up the pipe 1. As it appears from the FIGS. 2 and 3 the closures 3 and 4 as well as the pipe 1 are supplied with a funnel-shaped slot 6 to facilitate the leading-in of the wire 10 into the pipel. The dimensioning of a sphere 7 is thus determined by the breadth of this slot and by the diameter of the circular hole in the lead-in 5. In the present embodiment the diameter of the circular hole is 5 mm and the diameter of a sphere is 6 mm. As it appears from FIG. 2 the inner diameter of the circular pipe is about 6 times a sphere diameter, that is about 36 mm.

On the inner wall of the pipe 1 a metal strip 2 as an electrode is attached, to which stirp an insulated conductor 12 is connected in order to connect the metal strip with an external testing voltage. The metal strip can consist of for example white copper, and a suitable value on the test voltage is 3–5 kV. The pipe 1 is adapted in a body 13 of insulating material, which by means of screw joint 11 is attached to a preferably horizontal support 14.

The pipe 1 can also consist of a completely metallic body, for example of stainless steel, the whole pipe 1 and the metal spheres forming the electrode. This embodiment is preferable, as the movements of the spheres around the wire 10 in this case is not prevented by a metal strip 2.

As has been described above, the spheres 7 will be brought into movement by the fact that the wire 10 runs through the pipe in its longitudinal direction. For a more effective drying of the wire an external compressed air source can be arranged as shown in FIG. 2. By 8 an inlet to the pipe 1 is indicated, a tube 9 being connected via a connection with the inlet 8. Along the pipe 1 several inlets can be arranged. Through the tube 9 and the inlet 8 compressed air from an outer source can be forced out peripherically into the tube 1.

If compressed air is supplied through the tube 9 the metal spheres 7 will whirl around in the pipe 1. For a sufficient number of spheres in the pipe 1, according to a statistical distribution, metallic contact will occur via the spheres at different places along the pipe and between it or the metallic strip 2 acting as electrodes and the spheres 7. These will then touch the insulated wire 10 during varying time intervals, the testing voltage appearing between electrode and wire insulation. The conductor in the wire is, before it passes through the place where insulation takes place, connected to ground potential and has relatively the electrode the potential zero.

The required pressure of the air stream which passes through the inlet 8 is in the present embodiment 3.5 – 4 kg/cm$^2$ in order to force the spheres to rotate satisfactorily around the insulated conductor which runs through the pipe 1. The pressure can apparently be diminished if spheres with a smaller diameter than 6 mm are used. It is suitable to carry out the test at room temperature and with normal athmospheric humidity.

The advantages which are obtained with the present invention can be summed up as follows.

The spheres are completely free from each other and an abrasion that risks the function or the lifetime of the arrangement does not appear. The abrasion of the steel spheres takes primarily place as a polishing of these.

Any coating on the balls has no time to arise by the polishing.

Dust of insulation material and so on is also separated by the air stream.

Sound from the air stream is damped to a great extent, as it is distributed between the spheres and finally vanishes through the slot 6 and the lead-in 5.

The arrangement has a dual function that is on the one hand voltage testing and on the other hand drying of a plastically insulated electrical conductor.

The arrangement according to the invention can be given different embodiments within the scope of the appended claims.

We claim:

1. A method for voltage testing and drying an extruded or equivalently treated insulated conductor having an inner core of electrically conducting material and an outer insulation which is damp comprising the steps:

drawing the damp conductor in its longitudinal direction through a chamber, said chamber containing electrically conducting and freely movable spheres and said spheres contacting each other and the insulation of said conductor, and applying a test voltage across the inner core of the conductor and said spheres while forcing the spheres in said chamber into movement around said insulated conductor so that the moisture on the insulation is transferred to the surfaces of all the spheres for faster evaporation while simultaneously testing the insulation of the insulated conductor.

2. Method according to claim 1, wherein said spheres are brought into movement by means of the movement of the insulated conductor in contact with said spheres.

3. Method according to claim 1, wherein said spheres are brought into whirl like rotation movement around said conductor.

4. An electrode arrangement for simultaneously voltage testing and drying an extruded or equivalently treated insulated conductor having an inner core of electrically conducting material and an outer insulation which is damp, comprising:

a voltage source;

a stationary pipe having at least an inner wall which is metallic;

a lead-in means adapted to close the open ends of said stationary pipe and for guiding the insulated conductor to run through said stationary pipe in its longitudinal direction, said lead-in means having openings for letting air pass through said stationary pipe;

means for connecting a voltage to said inner wall which is metallic and to the core of the insulated conductor;

a plurality of electrically conducting spheres fully and randomly movable to different locations in said stationary pipe for enabling an electrical contact between the insulation of the insulated conductor and the inner wall of said stationary pipe; and means for bringing said spheres into movements around the insulated conductor to obtain a drying function of the insulation of the insulated conductor.

5. Electrode arrangement according to claim 4 further comprising a source of compressed air and an inlet for connecting said stationary source to said pipe.

6. Electrode arrangement according to claim 5, wherein said inlet is arranged peripherically to said pipe.

7. Electrode arrangement according to claim 4 wherein said entire pipe is metallic.

8. Electrode arrangement according to claim 4 wherein said pipe is of insulating material and has an inner wall which is metallic.

* * * * *